UNITED STATES PATENT OFFICE.

CHARLES N. TYLER, OF BUFFALO, NEW YORK.

IMPROVED COMPOSITION FOR BURNING-FLUIDS.

Specification forming part of Letters Patent No. 38,015, dated March 24, 1863.

*To all whom it may concern:*

Be it known that I, CHARLES N. TYLER, of Buffalo, in the county of Erie and State of New York, have invented or discovered certain new and useful compounds produced by the combination of the earthy and mineral oils with fusel-oil or fusel-oil and alcohol; and I do hereby declare that the following is a full and clear description of said invention or discovery, and of the manner of manufacturing the said compounds.

The object of my invention or discovery is to extend the utility of the "mineral" and "earthy" oils, in which terms may be included the petroleum or rock oils, or naphthas obtained directly from springs, the kerosene or paraffine oils, as they are sometimes called, which are obtained by distillation of bituminous substances, and coal and the refining of petroleum and other oils and naphtha that are derived by the distillation from the above-named substances.

The first part of my invention or discovery consists in a new compound substance, being a combination of fusel-oil with the mineral and earthy oils, which compound constitutes a "burning-fluid," by which term I mean a liquid which will burn for the purpose of illumination, without material smoke, in a lamp with a small solid wick and without a chimney.

The second part of my invention or discovery consists of a new compound substance produced by the combination of fusel-oil with naphtha and with alcohol, which compound constitutes a burning-fluid.

The third part of my invention or discovery consists in the heavy oily liquids obtained by the combination of the petroleums, kerosenes, and other earthy oils with fusel-oil and the separation of the compound into parts by alcohol, the said heavy oily liquids constituting an oil suitable for painters and mechanical uses.

In the manufacturing of said compounds I make use of the crude fusel-oil obtained in the distillation of fermented grain and other substances for alcoholic liquors. It may be preferred to use that which is obtained from maize or "Indian corn," as it is commonly called, although that obtained in the distillation of various other fermented vegetable substances will answer the purpose. Refined fusel-oil may be also be used, if preferred; but as the crude oil will answer the purpose the cost of refining is saved.

In manufacturing the compound which constitutes the first part of the invention or discovery, I find that a combination of crude fusel-oil with the ordinary kerosene found in the market, (for the purpose of burning in kerosene-lamps, with a chimney and air-deflector,) whether such kerosene be derived from distillation of the crude coal-oils or from crude petroleum, will produce a good burning-fluid, capable of use in the common lamp without a chimney, when combined in the following proportions, by measure, viz: crude fusel-oil, one part; kerosene, one part. The two substances are agitated together in a vessel, so as to commingle them, and the mixture is permitted to rest a longer or shorter period, which depends upon circumstances, and which is generally less than twenty-four hours, when the mixture is found separated into two parts. The lower part is a watery liquid, which is small in bulk, and consists mainly of the water that exists in crude fusel-oil, which is drawn off from the bottom of the vessel, or it may be separated at once by the introduction of alcohol. The upper part is the compound substance produced by the combination of the fusel-oil with the kerosene, constituting the burning-fluid. In making this combination it is preferable to permit the mixture to settle in a vessel having a funnel-shaped bottom fitted with a stop-cock, so as to facilitate the withdrawal of the watery liquid with the least possible waste of burning-fluid or upper liquid, or the lower liquid may be withdrawn from the other by a siphon.

Naphtha and petroleum may be combined with fusel-oil alone in the same manner as kerosene, and is the compound substance constituting the second part of my invention or discovery, which is a good burning-fluid. It may be produced from naphtha by combining it with fusel-oil and alcohol in the following proportions, by measure, viz: naphtha, four parts; crude fusel-oil, one part; alcohol, one and one-half part. The naphtha and fusel-oil are first commingled, and the watery matter withdrawn, as before mentioned. The alcohol is then combined with the remainder by agitation. The alcohol for this purpose should be as nearly absolute as is found for sale in quantities in this market—say alcohol of ninety-five per cent.

In manufacturing the substance which constitutes the third part of my invention or discovery, I prefer to employ the crude petroleum obtained from oil-springs and separated by decantation from the water with which it is generally mixed. The petroleum is first commingled by agitation with crude fusel-oil in about the following proportions, by measure, viz: crude petroleum, three parts; crude fusel-oil, one part. The mixture is permitted to settle and the watery liquid withdrawn, as before mentioned. Then the residue is mixed by agitation with alcohol until it separates completely into two portions. To effect this result it is found that from half to two-thirds as much alcohol as fusel-oil is generally required. When the mixture has settled the upper part is drawn off and constitutes a good burning-fluid. The lower part, which is the heavier substance, constitutes an oil for painters' use and other mechanical purposes.

Having thus described the modes in which this discovery may be practiced with success, I do not confine this invention or discovery to the particular relative proportions in which the substances have been described as being combined, as the proportion may be varied according to circumstances or to suit the peculiar views of the manufacturer or user. Thus, in making the burning-fluid larger or smaller proportionate quantities of fusel-oil may be used; but if there be too small a quantity of fusel-oil the burning-fluid will smoke in burning with a round wick in lamps without chimneys when the flame is as high as it should be—say one and one-half inch; and, on the other hand, if a larger quantity of fusil-oil be used the flame will have less illuminating power. The object in view in manufacturing a burning-fluid should be to produce the strongest light without material smoke when the wick is pulled up above the wick-tube until the flame is at the desired height. The least possible quantity of fusel-oil should be used compatible with producing the result. Nor do I confine this discovery to the combination of kerosene alone or naphtha alone with fusel-oil, as the first combination described may be varied by the substitution of naphtha or crude petroleum in place of kerosene, or a part of the kerosene may be replaced by an equal quantity of naphtha or crude petroleum.

It is proper to state that the character of the compound is affected by the kind of mineral oil that is used, and the exact quantity of fusel-oil which is necessary to produce the most desirable compound should be determined for each kind of mineral oil used by experiment. Small quantities of alcohol may be added to a combination of kerosene and fusel oil without producing any separation of the combination into parts.

This discovery is not confined to the manufacturing of burning-fluid and painters' oils; but I claim the several parts of the invention or discovery for all purposes for which the combinations may be found useful in the arts.

I am aware that kerosene has been used in an illuminating-fluid in which fusel-oil and camphene constituted the largest proportion or base of the composition, and in which the object of the invention was to render fusel-oil available as a burning-fluid by the commingling of camphene and a small proportion of kerosene. In my invention, however, the end in view is to render the earthy oil which constitute the base of the compositions better adapted than heretofore for illuminating and other purposes by treating or cutting them with fusel-oil or fusel-oil and alcohol. Therefore I do not broadly claim the use of fusel-oil or fusel-oil and alcohol except when combined with the earthy oils, substantially as hereinbefore set forth.

Having thus described my discovery and the best mode with which I am acquainted of practicing the same, I claim as my invention or discovery and desire to secure by Letters Patent—

1. The compound produced by the combination of the mineral or earthy oils with fusel-oil, in the manner and for the purpose substantially as herein set forth, said compound constituting a new manufacture.

2. The compound produced by the combination of naphtha with alcohol and fusel-oil.

3. The heavy liquid obtained by treating the combination of petroleum or kerosene and fusel-oil with alcohol.

CHARLES N. TYLER.

Witnesses:
A. C. TYLER,
E. A. TYLER.